May 26, 1970   F. J. ADAMS   3,513,879
PORTED DISC VALVE
Filed Aug. 16, 1968   3 Sheets-Sheet 1
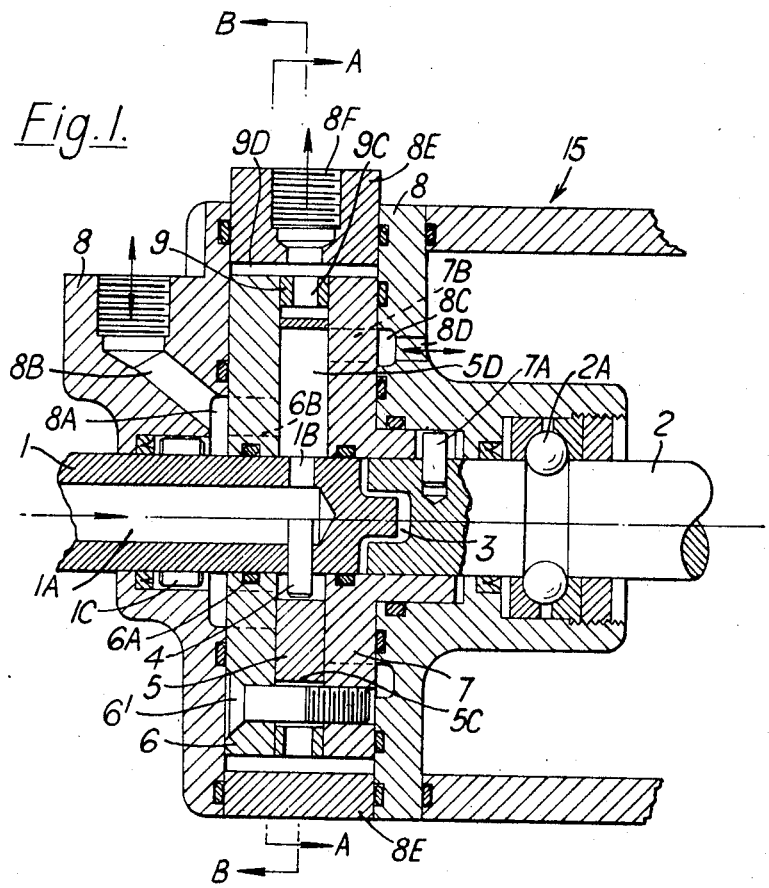
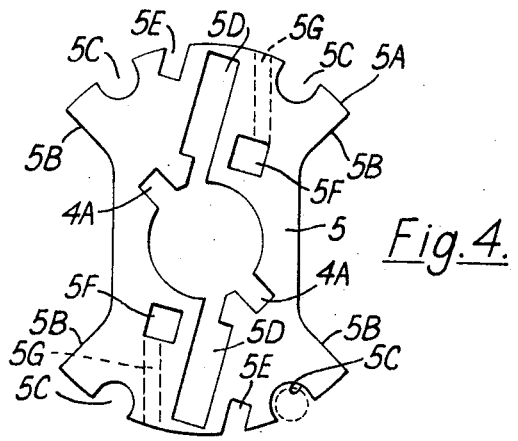
Inventor
Frederick John Adams
By
Attorneys Inventor
Frederick John Adams
By
Attorneys

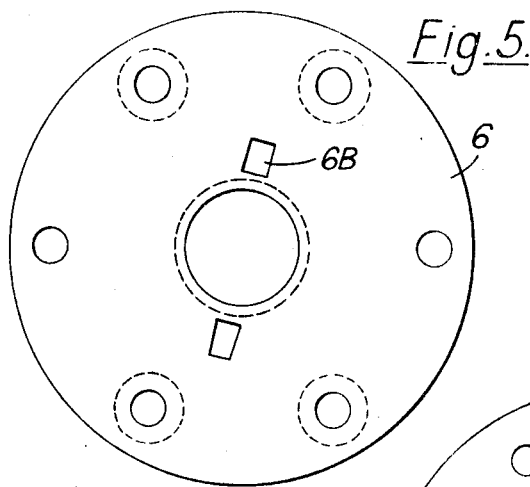
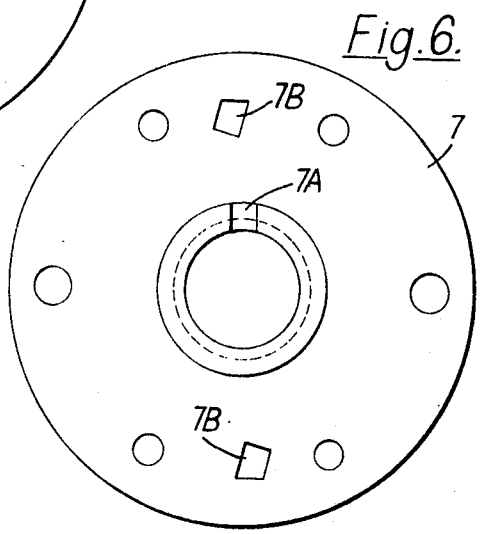
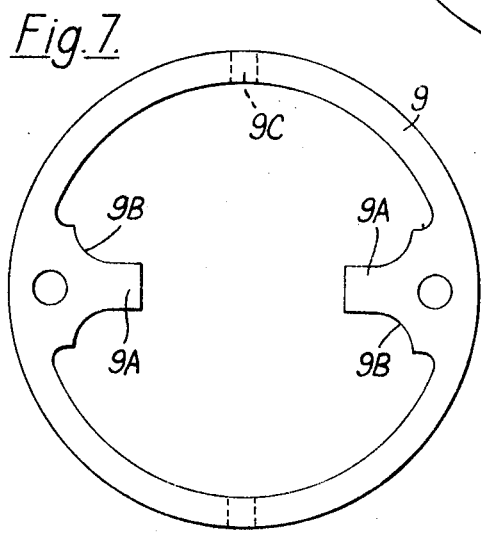
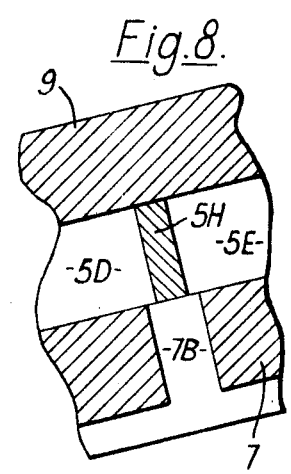

United States Patent Office
3,513,879
Patented May 26, 1970

3,513,879
PORTED DISC VALVE
Frederick J. Adams, Campton, near Shefford, England, assignor, by mesne assignments, to Cam Gears, Ltd., Hitchin, England, a British company
Filed Aug. 16, 1968, Ser. No. 753,097
Claims priority, application Great Britain, Aug. 16, 1967, 37,602
Int. Cl. F15b 9/10; F16k 11/08
U.S. Cl. 137—625.21                    13 Claims

ABSTRACT OF THE DISCLOSURE

A fluid flow valve including a valve housing in which the flow of fluid is controlled between a fluid inlet, a fluid outlet and a pair of servo-motor ports by means of disc-shaped valve members having cooperating radial faces with apertures formed therein movable into and out of fluid communication with one another in response to relative rotation of the valve members and an input and an output shaft journalled in the valve housing and connected respectively to said valve members for joint rotation therewith.

BACKGROUND OF THE INVENTION

The present invention relates generally to fluid flow control valves and more particularly to a flow control valve adapted for use in a servo-system such as a power assisted steering system.

In many servo-systems fluid is conveyed from a high-pressure source to either of two sides of a double acting servo-motor in response to the operation of a fluid flow control valve. For example, in many power steering systems pressurized fluid is directed from a fluid pump to a control valve from which it is directed alternatively to either of the two ends of a pressurized-fluid-operated piston-cylinder arrangement connected in the steering linkage. The fluid control valve operates in response to torque applied thereto, both quantitatively and directionally. One valve member in the valve is connected to the steering wheel and a cooperating valve member is connected to the steering linkage whereby follow-up movements are conferred upon the valve members, as will be understood by those skilled in the art.

While some fluid flow control valves intended for the indicated purpose are known in the prior art, the physical size thereof is such as to render the same unsuitable in meeting the requirements for compactness presently being sought in power assisted steering systems and the like. This is primarily due to the arrangement of the valve members in the known valves which includes one sleeve valve nested within another such that the various cooperating ports in the valve members are formed in the cylindrical walls thereof.

SUMMARY OF THE INVENTION

The present invention improves the compactness of a fluid flow control valve by utilizing disc-shaped valve members wherein the cooperating valving ports are formed in the radial faces of the valve members.

More particularly, the present invention comprises a valve housing in which are formed a pressurized fluid inlet, a return fluid outlet and a pair of ports adapted to communicate with the opposite ends of a dual-acting servo-motor such as a piston-hydraulic cylinder arrangement. A work input shaft adapted, for example, for connection with the steering linkage, are journalled for relative rotation in the housing. A pair of disc-shaped valve members are mounted respectively on the two shafts for joint rotation therewith. The valve members are adapted for relative rotation from a neutral or centered position, at which the pressurized fluid is directed so as to provide a balanced condition in the piston-hydraulic cylinder arrangement, to either of two operating positions disposed on opposite sides of the neutral position and at which the pressurized fluid is directed so as to pressurize one of the ends of the hydraulic cylinder. Means for provided for biasing the valve members onto their corresponding shafts to the neutral position thereof and the valve members each comprise radial faces in which are formed cooperating apertures moved into and out of registry or fluid communication with one another as the valve members are moved from the neutral to one of the operating positions.

Additional features of the invention include means coupling the two shafts together for limited relative rotation, whereby the steered wheels in a power steering system, for example, can be controlled directly through the work input and output shafts in the event of failure of the fluid pump which provides the pressurized fluid. Another feature resides in the provision of a pair of radial walls in the valve housing in which the ports communicating with the opposite sides of the hydraulic cylinder are formed. Another feature resides in the provision of a fluid passageway in the work input shaft and through which the pressurized fluid is directed to the valve members.

The disc-shaped valve members enable the valve of the present invention to be substantially reduced in size for any given fluid flow rate and pressure drop. This reduction in size is particularly significant in a direction corresponding to the axes of the shafts.

It is, therefore, an object of the present invention to provide a more compact fluid flow control valve particularly adapted for use in power-assisted steering systems.

Another object of the invention is to provide a follow-up type flow control valve in which the valve members are disc-shaped rather than cylindrically shaped.

Another object is to provide a simplified valve construction in which fluid leakage is reduced and operating efficiency increased.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWING

FIG. 1 is a sectional view of a fluid flow control valve constructed in accordance with the principles of the present invention.

FIG. 4 is a front elevational view of a distributor plate of the present invention.

FIGS. 5 and 6 are front elevational views of two valve elements of the present invention.

FIG. 7 is a front elevational view of a spacer element of the present invention.

FIG. 8 is an enlarged fragmentary sectional view taken along lines C—C in FIG. 3.

DESCRIPTION OF THE PREFERRED EMBODIMENT

Figure 2:
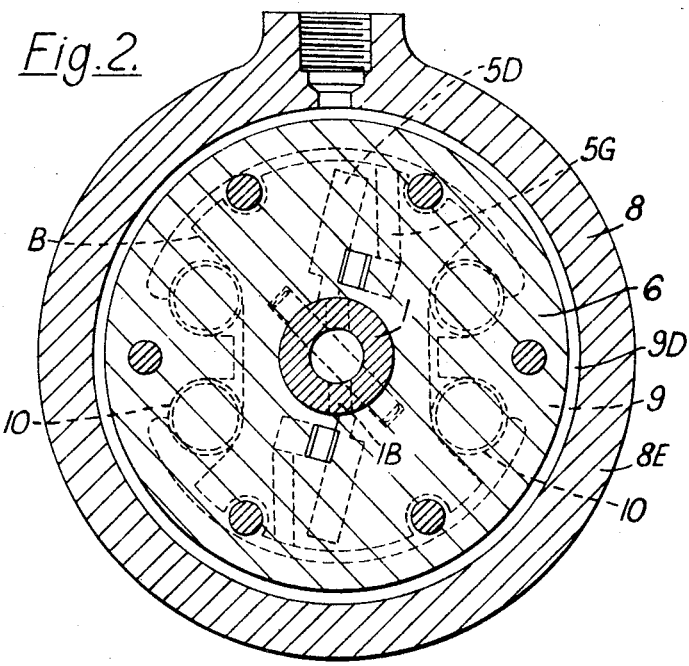
FIG. 2 is a sectional view taken along lines A—A of FIG. 1.

Although the principles of the present invention are applicable in any fluid flow control valve for controlling the flow of pressurized fluid to and from a dual-acting servo-motor, the invention finds particular utility in the field of power-assisted steering systems and the embodiment thereof herein shown comprises a fluid flow control valve particularly adapted for vehicular power steering systems.

Referring to the drawings, a control valve constructed in accordance with the principles of the present invention is indicated generally in FIG. 1 at reference numeral 15. The valve 15 may be more particularly characterized as comprising a work input shaft 1 and a work output shaft 2 axially aligned with one another. The input shaft 1 may be connected directly to the steering wheel of the vehicle and output shaft 2 may be connected directly to the steering linkage of the vehicle. In order to provide for manual steering in the event of failure of main fluid pump, the shafts 1 and 2 are provided with a dog engagement as indicated as reference numeral 3, which affords rotational clearances greater than the operational limit of the valve 15 as a whole.

The illustrated embodiment of the input shaft 1 is axially bored as at 1A to form an input duct for receiving pressurized fluid from a suitable source such as a main fluid pump. The bore 1A communicates with ducts 1B extending radially with respect to the axis of the shaft 1.

Disposed within the valve 15 are a pair of valve members, one of which is indicated at reference numeral 5 and which may be referred to as a distributor plate. The distributor plate 5 is coupled to the input shaft 1 for joint rotation therewith by means of a pin and a slot arrangement as indicated at reference numeral 4.

As shown in FIG. 4, the distributor plate 5 comprises a peripheral wall 5A and radially inwardly extending surfaces 5B. A series of notches 5C are also formed in the plate 5 for receiving with suitable clearance fastening members such as the bolts indicated at 6' in FIG. 1.

Also formed in the distributor plate 5 are a pair of channels 5D which are arranged in parallel relation with one another and in slightly offset radial relation with respect to the axis of the plate 5. The channels 5D are arranged so as to communicate freely with the bores 1B formed in the input shaft 1, and may be regarded as being always subject to fuel pressure.

A series of rectangular notches 5E are formed in the plate 5 and open to the peripheral wall 5A. Also included in the plate 5 are a pair of rectangularly-shaped ports 5F which are connected by a corresponding pair of grooves 5G formed within the plate 5 along one side thereof to the peripheral wall 5A.

Another of the valve members comprises a pair of disc-shaped valve elements 6 and 7 disposed on opposite sides of the distributor plate 5. Valve element 6 is mounted for relative rotation on the input shaft 1 and a seal as indicated at 6A is mounted on the valve element 6 in surrounding relation to the shaft 1.

Also formed in valve element 6 are a pair of rectangularly-shaped ports as indicated at 6B which are disposed so as to overlap or, in an operating position of the valve element, nearly register with the ports 5F.

Valve element 7 is coupled for joint rotation with the work output shaft 2 by means of a pin and slot arrangement as indicated at 7A. Valve element 7 has a pair of substantially rectangular ports 7B formed therein and arranged so as to overlap or, in an operating position, nearly register with the notches 5E and, in a neutral or centered position, to overlap both the notches 5E and the channels 5D.

The ports 6B are arranged in open communication at all times with an annular passage 8A formed in a housing 8 of the valve 15. The passage 8A is in open communication at all times, via duct 8B, to one side of the dual-acting hydraulic cylinder.

The ports 7B open at all times to an annular passageway 8C formed in the valve housing 8, which passage is in open communication at all times via duct 8D to the other side of the hydraulic cylinder.

The valve elements 6 and 7 are rigidly secured together for joint rotation by virtue of the fasteners 6'. Sandwiched together between valve elements 6 and 7 is a ring spacer 9. Spacer 9 also rotates jointly with valve elements 6 and 7 by virtue of a pair of fasteners 6' which extend therethrough in a pair of bores formed in bosses 9A which extend radially inwardly into recesses formed in the distributor plate 5 and which present arcuately shaped abutment surfaces 9B.

Between the abutment surfaces 9B formed on the spacer 9 and abutment surfaces 5B formed on the distributor plate 5 are disposed a plurality of suitable biasing members which, in the illustrated embodiment, comprise four helical springs 10 which serve as torsion-coupling elements between the distributor plate 5 and the spacer 9. The springs 10 are able to deform radially under the diametral compression acting on an oppositely disposed pair thereof when a torque is applied therethrough through the work input shaft 1. Other biasing members such as slugs or the like constituted of elastomeric material may also be utilized.

As a result of the fasteners 6' and the pin and slot arrangement 7A, the valve elements 6 and 7 and the ring spacer 9 are all connected in fixed assembly for joint rotation with the work output shaft 2. The distributor plate 5 is, of course, connected for joint rotation with the work input shaft 1 through the pin and slot arrangement 4. Fluid seals are provided throughout as indicated between relatively moving parts. Also included is a roller or needle bearing 1C for the work input shaft 1 and a ball thrust-bearing as at 2A for the shaft 2.

Also formed in the housing 8 is a fluid passageway 8F for connection to the return side of the main fluid pump. An annular space 9D is provided in the housing 8 in surrounding relation to the periphery of valve elements 6 and 7 and ring spacer 9, which annular space 9D is in open communication with a plurality of bores 9C extending radially through the ring spacer 9.

Figure 3:
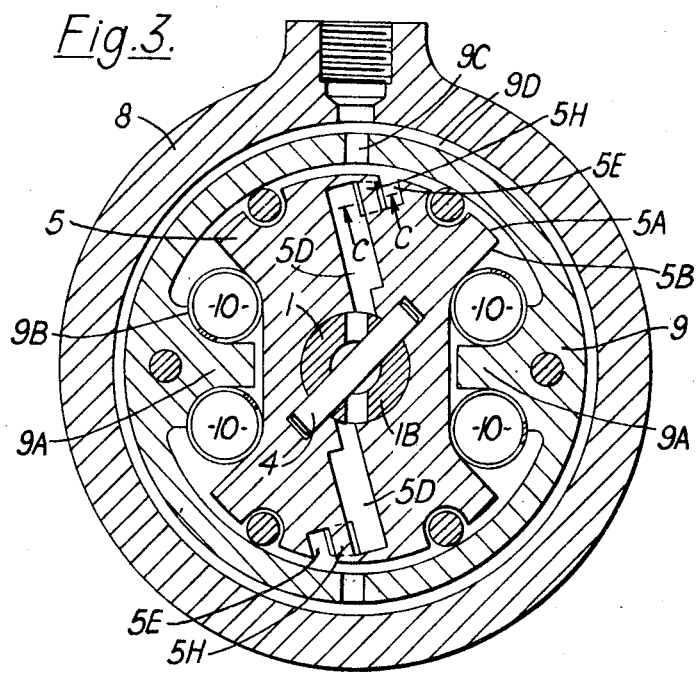
FIG. 3 is a sectional view taken along lines B—B of FIG. 1.

As shown in FIGS. 2 and 3, the overlap of ports 6B and 7B, when the shafts 1 and 2 and the valve members are disposed in a neutral or centered position, that is, when the work input shaft 1 is not subject to torque, comprises in effect an open-center valve arrangement in which the bore 1A formed in the work input shaft 1, the opposite sides of the hydraulic cylinder communicating with ports 8B and 8D and the "return" 8F are all in open communication with one another. In operation, if torque is applied between the work input shaft 1 and the work output shaft 2, so as to deform one pair of the helical springs 10, then one pair of ports, for example, ports 6B is moved out of fluid communication with the supply bore 1A and instead communicates only with one of the servo-motor ports, while the other pair of ports 7B is in open communication only with the pressurized fluid in 1A and the other end of the servo-motor. If the torque on the work input shaft 1 is reversed, the other pair of helical springs 10 is deformed and the flow through the valve 15 is reversed.

FIG. 8 illustrates the relative disposition of parts when the valve members have assumed the neutral position to which they are biased by the springs 10. Portion 5H of the distributor plate 5 is shown as providing an open overlap with respect to ports 7B so that channel 5D is in open communication with the groove 5E. If, as viewed in FIG. 3, the distributor plate 5 is rotated clockwise then portion 5H will move up and to the right as shown in FIG. 8, and channel 5D will be cut off from 5E and fluid pressure is exerted through 7B and thence via 8D to one end of the hydraulic cylinder or servo-motor.

For the purpose of effecting adjustment of the neutral or centered position of the valve members, which adjustment is sometimes desirable in power steering systems, the helical springs 10 may be selectively assembled so that the diameter of one pair is different from that of the other. Thus, the initial setting of the distributor plate 5 relative to the valve elements 6 and 7 can be selected. To eliminate end-loads through the valve 15 the pin at 7A is preferably slot-engaged in the valve element 7. The interfaces of the distributor plate 5 and the valve elements 6 and 7 provide only so much clearance, through selection of the thickness of the ring spacer 9, so as to afford sufficient lubrication by the fluid employed, without excessive leakage. It is apparent, however, that fluid which may leak within the system will merely return to the fluid outlet port 8F.

Although minor modifications might be suggested by those versed in the art, it should be understood that I wish to embody within the scope of the patent warranted hereon all such modifications as reasonably come within the scope of my contribution to the art.

I claim as my invention:

1. A fluid valve comprising:
   a housing having an inlet port, an outlet port, and a pair of servo-motor ports,
   input and output shaft members journalled for rotation in said housing and rotatable relative to one another in opposite directions from a centered position to a pair of operating positions,
   valve means comprising first and second disc-shaped valve members mounted on said input and output shafts for joint rotation respectively therewith and each comprising means forming radial walls extending perpendicularly to the axes of said shafts,
   fluid flow passageway means including apertures formed in said radial walls and movable into fluid communication with one another depending upon the position of said shafts, and means biasing said shafts to said centered position,
   said valve means being constructed and arranged so as to communicate said inlet port with one of said servo-motor ports and said outlet port with the other of said servo-motor ports in one of said operating positions and to reverse the communication of the ports in the other of said operating positions.

2. The invention as defined in claim 1 wherein said housing comprises a pair of radial walls situated axially on opposite sides of said disc-shaped valve members and in which said servo-motor ports are formed.

3. The invention as defined in claim 1 wherein said valve means is further constructed and arranged so as to communicate said inlet port with said outlet port in the centered position of said shafts.

4. The invention as defined in claim 1 wherein said valve means is further constructed and arranged so as to communicate all of said ports with one another in the centered position of said shafts.

5. The invention as defined in claim 1 wherein said inlet port is formed in said input shaft and including passageway means formed in said input shaft communicating with said inlet port and adapted for connection to a source of pressurized fluid.

6. The invention as defined in claim 1 wherein said valve members comprise a pair of axially-spaced disc-shaped valve elements mounted for joint rotation on one of said shafts and a disc-shaped distributor plate sandwiched between said valve elements and mounted for joint rotation on the other of said shafts,
   said fluid flow passageway means comprising passages in said valve elements communicating respectively with said servo-motor ports.

7. The invention as defined in claim 1 wherein said input and output shafts and said valve members are axially aligned.

8. The invention as defined in claim 7 and including means coupling said distributor plate and said valve elements for limited relative rotation.

9. The invention as defined in claim 1 wherein said biasing means comprises cooperating radial abutment surfaces formed on said valve members and a helical spring having an axis parallel to the axis of said shafts disposed between said abutment surfaces in abutting engagement therewith.

10. The invention as defined in claim 1 including means co-rotatably interconnecting said shafts for providing only limited relative rotation between said shafts.

11. The invention as defined in claim 6 wherein said fluid flow passageway means comprises means forming in said distributor plate a pair of flow channels extending generally away from the axis of said distributor plate and in off-radial relation therewith and in parallel relation with one another.

12. A fluid flow control valve for power steering systems utilizing a double acting hydraulic cylinder connected to a mechanical steering linkage for controlling the steered wheels comprising:
    a valve housing having a pressure fluid inlet, a return fluid outlet and a pair of hydraulic cylinder ports formed therein, an input shaft adapted for connection to a steering wheel and an output shaft adapted for connection to the steering linkage journalled for relative rotation in said housing,
    a pair of disc-shaped valve members in said housing respectively mounted for joint rotation on said shafts for controlling the flow of fluid between said fluid inlet, said fluid outlet and said ports and including radial faces extending normal to the axes of said shafts,
    means forming fluid flow passages in said valve members including apertures in the radial faces thereof,
    said valve members being relatively rotatable by said shafts from a neutral position to one of two operating positions at which said fluid inlet is connected to only one of said ports and said return outlet is connected to the other of said ports, and
    means biasing said shafts to urge said valve members to the neutral position thereof.

13. The invention as defined in claim 12 wherein said housing further comprises means forming a pair of radial faces on opposite sides of said disc-shaped valve members in which said fluid inlet and said fluid outlet are formed.

References Cited

UNITED STATES PATENTS

| | | | |
|---|---|---|---|
| 1,082,733 | 12/1913 | Casey et al. | 91—375 |
| 1,947,973 | 2/1934 | Davis | 137—625.24 |
| 2,271,331 | 1/1942 | Elliott | 137—625.21 |
| 2,997,984 | 8/1961 | Ostwald | 137—625.21 XR |
| 3,145,626 | 8/1964 | Vickers et al. | 137—625.24 XR |
| 3,207,180 | 9/1965 | Mercier | 137—625.21 |
| 3,296,939 | 1/1967 | Eddy | 137—625.24 XR |

M. CARY NELSON, Primary Examiner

R. J. MILLER, Assistant Examiner

U.S. Cl. X.R.

91—375

UNITED STATES PATENT OFFICE
CERTIFICATE OF CORRECTION

Patent No. 3,513,879            Dated October 1, 1970

Inventor(s) Frederick John Adams

It is certified that error appears in the above-identified patent and that said Letters Patent are hereby corrected as shown below:

Last para., line 68 of Column 1, after "example," insert: "to connect with the steering wheel of a power-assisted steering system and a work output shaft adapted, for example".

Column 2, line 7, "means for" should be "means are".

SIGNED AND SEALED
NOV 17 1970

(SEAL)
Attest:

Edward M. Fletcher, Jr.
Attesting Officer

WILLIAM E. SCHUYLER, JR.
Commissioner of Patents

FORM PO-1050 (10-69)